United States Patent [19]

Nishino et al.

[11] Patent Number: 5,237,424
[45] Date of Patent: Aug. 17, 1993

[54] DIGITAL VIDEO SIGNAL RECORDING/REPRODUCING APPARATUS

[75] Inventors: Masakazu Nishino, Kashiwara; Tatsuro Juri, Osaka; Hideki Otaka, Neyagawa, all of Japan

[73] Assignee: Matsushita Electric Industrial Co., Ltd., Osaka, Japan

[21] Appl. No.: 736,054

[22] Filed: Jul. 26, 1991

[30] Foreign Application Priority Data

Jul. 30, 1990 [JP] Japan ................................. 2-202126

[51] Int. Cl.[5] ........................ H04N 9/79; H04N 7/137
[52] U.S. Cl. .................................... 358/310; 358/133
[58] Field of Search ................. 358/310, 133, 134, 13, 358/339, 334; 360/33.1, 32

[56] References Cited

U.S. PATENT DOCUMENTS

| 4,897,739 | 1/1990 | Hasegawa et al. | 358/310 |
| 4,974,078 | 11/1990 | Tsai | 358/13 |
| 5,027,193 | 6/1991 | Kani et al. | 358/310 |
| 5,032,927 | 7/1991 | Watanabe et al. | 358/113 |
| 5,068,744 | 11/1991 | Ito | 358/310 |
| 5,073,821 | 12/1991 | Juri | 358/133 |

Primary Examiner—Tommy Chin
Assistant Examiner—Huy Nguyen
Attorney, Agent, or Firm—Wenderoth, Lind & Ponack

[57] ABSTRACT

A digital video signal is shuffled such that blocks of a luminance signal and a chrominance signal existing at a same position on an image plane are contained in a same segment recorded on a recording medium or in a plurality of segments recorded simultaneously in parallel using a plurality of channels. Thus, the luminance signal and chrominance signal being at the same position on the image plane are always obtainable simultaneously even during high-speed reproducing in a digital VTR.

5 Claims, 7 Drawing Sheets

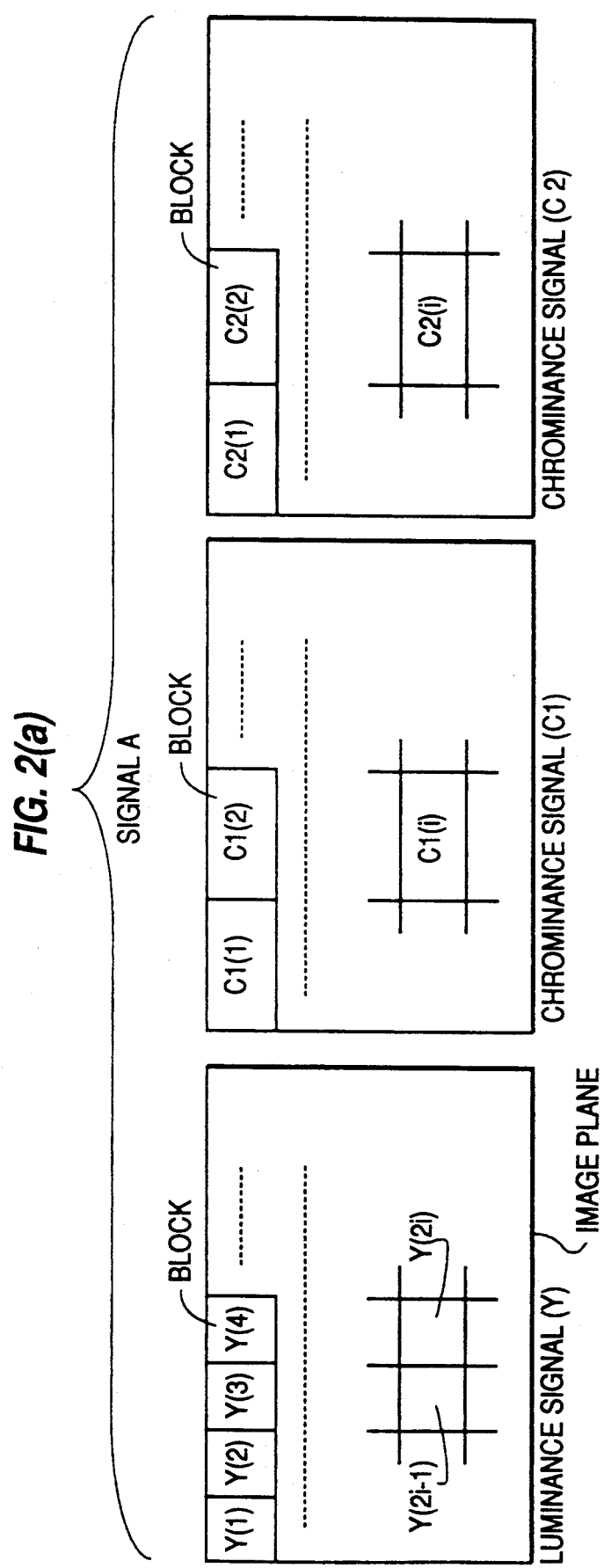

DIGITAL VIDEO SIGNAL RECORDING/REPRODUCING APPARATUS

BACKGROUND OF THE INVENTION

1. Field of the Invention

This invention relates to a digital video signal recording/reproducing apparatus such as, for example, a digital video tape recorder (VTR) in which a digital video signal is subjected to high-efficiency encoding and recorded in or reproduced from a recording medium.

2. Description of the Prior Art

As a conventional digital video signal recording/reproducing apparatus, the rotary head type digital VTR is available, in which a digital video signal is not subjected to high-efficiency encoding and the pixel data are recorded directly on a recording medium.

Some conventional digital VTRs employ a shuffling process. This shuffling process is a This shuffling process is a process for differing the arrangement of pixels of the video signal from that of pixels to be recorded on a magnetic tape to the largest extent possible. The shuffling process has such effects that errors in the tape head system during reproduction are not concentrated on a reproducing image plane but are instead dispersed to thereby reduce any adverse visual influence, and the reproduced image of a digital VTR in a high speed reproduction mode can be easily visualized. Particularly, in the high speed reproduction mode, the head on a rotary drum obliquely crosses tracks recorded on the tape, so that the signals detected by the reproducing head are skippingly positioned with respect to the recording pattern. With the digital VTR, a high-speed reproducing image plane is formed of only the pixels detected, and if subjected to the shuffling process, the detected pixels are dispersed over the whole area of the image plane, resulting in such an effect that the image plane has no unnatural discontinuity.

On the other hand, a digital VTR using high-efficiency encoding will be considered below. Orthogonal transform encoding is known as an effective encoding method in this case. In orthogonal transform encoding an input video signal is divided into blocks each being composed of, for example, 8 horizontal pixels and 8 vertical pixels, totaling 64 pixels, on the image plane and transformed to the orthogonal components (for example, frequency components) in each block. As the orthogonal transform, the Hadamard transform or discrete cosine transform (hereinafter called DCT) can be used. Of these, the DCT has been commonly used as an orthogonal transform suitable for video information. After orthogonal transformation of each block, the video signal is subjected to variable length encoding and then, compression of the data amount in such a manner that the data of a specific number of blocks are collected to form a segment having a fixed length. In this case, however, when the blocks are shuffled and recorded digitally, blocks of the reproduced image in the high speed reproduction mode are dispersed over the whole area of the image plane. This dispersion is different from the dispersion of pixels, creating such a problem as reduction of image quality. One of the largest factors contributing to degradation in the image quality when reproducing at high speed resides in the luminance signal and chrominance signal, which are different in time from each other forming a block in a high speed reproducing image plane. Accordingly, when reproducing at high speed, different colors are reproduced with respect to the luminance signal not on a pixel by pixel basis but instead, on a block by block basis, each of which is a large area, resulting in a problem in that the color image plane cannot be correctly reproduced.

SUMMARY OF THE INVENTION

An object of this invention is to provide a digital video signal recording/reproducing apparatus capable of forming a correct color image plane having luminance and chrominance signals matched with each other on a time basis and on a positional basis on the image plane even in a high speed reproduction mode.

In order to attain the above-mentioned object, in an aspect of this invention, a digital video signal recording apparatus includes shuffling means for rearranging the order of a digital luminance signal and a digital chrominance signal such that a block of a luminance signal and a block of a chrominance signal existing at a same position on an image plane are contained in a same segment, and a digital video signal reproducing apparatus includes inverse-shuffling means for obtaining a block of a luminance signal and a block of a chrominance signal existing at the same position on an image plane from a same segment of a reproduced digital video signal.

In another aspect of this invention, a digital video signal recording apparatus includes shuffling means for rearranging the order of a digital luminance signal and a digital chrominance signal such that a block of a luminance signal and a block of a chrominance signal existing at a same position on an image plane are contained in segments to be recorded on a recording medium simultaneously in parallel using a plurality of channels, and a digital video signal reproducing apparatus includes inverse-shuffling means for obtaining a block of a luminance signal and a block of a chrominance signal existing at a same position on an image plane from segments of a reproduced digital video signal detected simultaneously in parallel using a plurality of channels.

As a result, blocks of a luminance signal and a chrominance signal of a digital video signal existing at a same position on the image plane are in a same segment recorded on a recording medium, or in a plurality of segments recorded simultaneously in parallel using a plurality of channels, so that the luminance signal and chrominance signal existing at the same position on the image plane can be always simultaneously obtained even in a high speed reproduction mode. Accordingly, a correct color image plane can be advantageously reproduced without being differently colored.

BRIEF DESCRIPTION OF THE DRAWINGS

FIGS. 2(a)-(c) show an arrangements of signal components for explaining the operation of the apparatus shown in FIG. 1.

DESCRIPTION OF THE PREFERRED EMBODIMENTS

Figure 1:
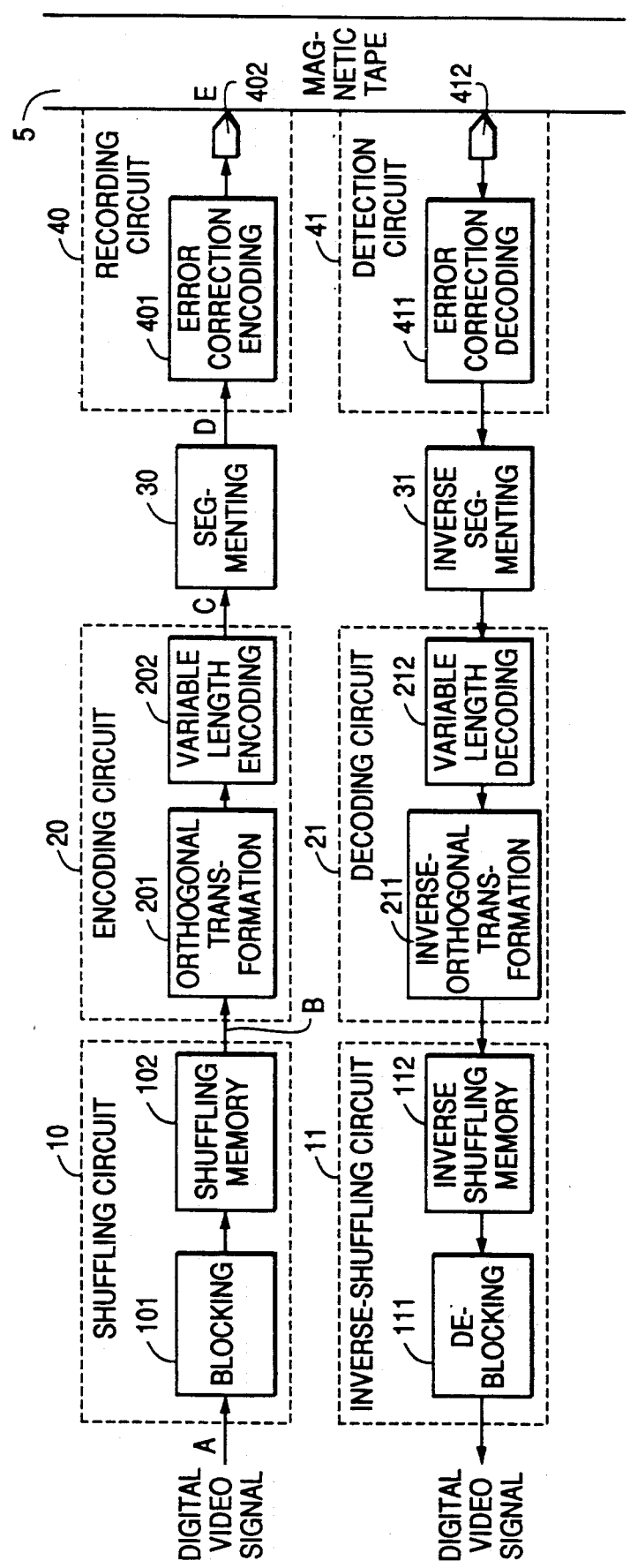
FIG. 1 is a block diagram of a digital video signal recording/reproducing apparatus according to a first embodiment of this invention.
Figure 2B:
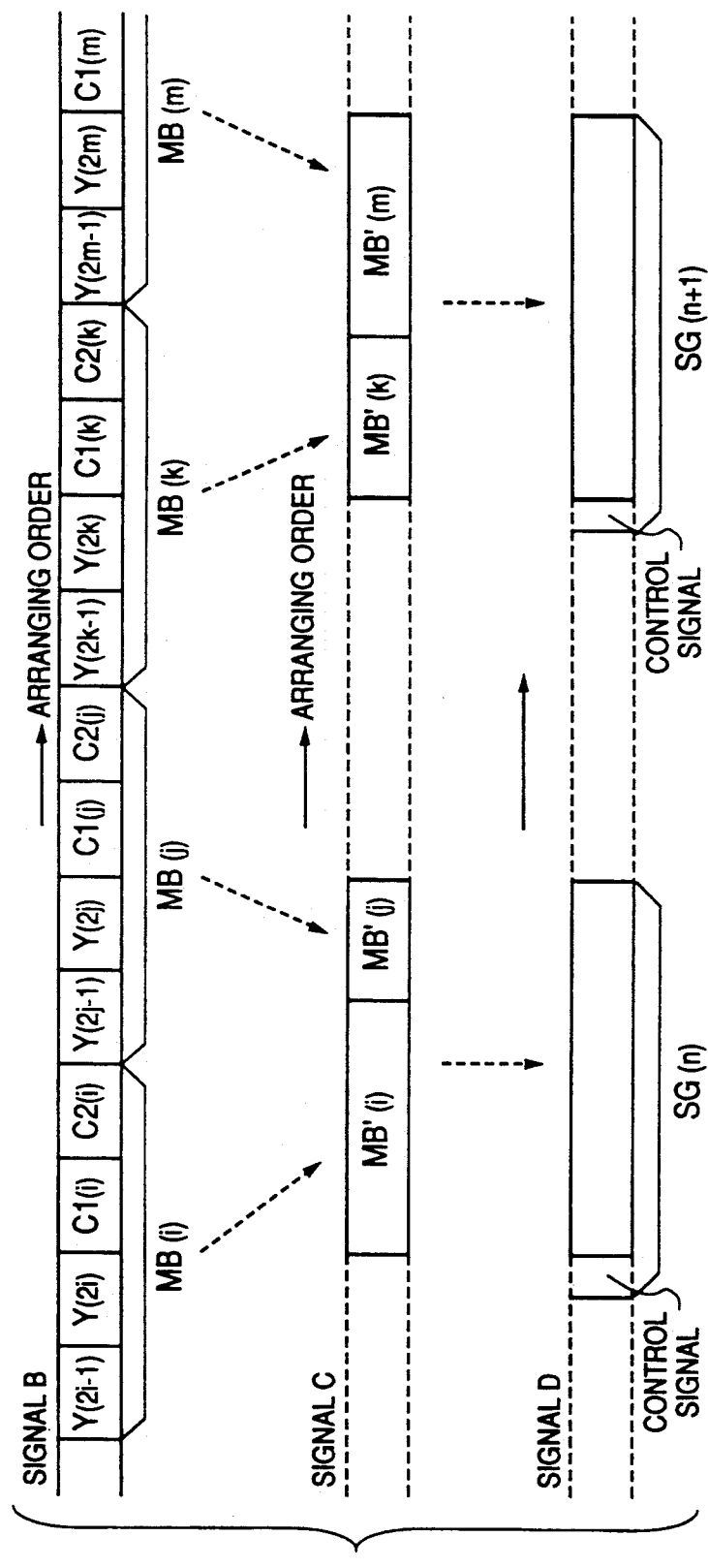
Figure 2C:
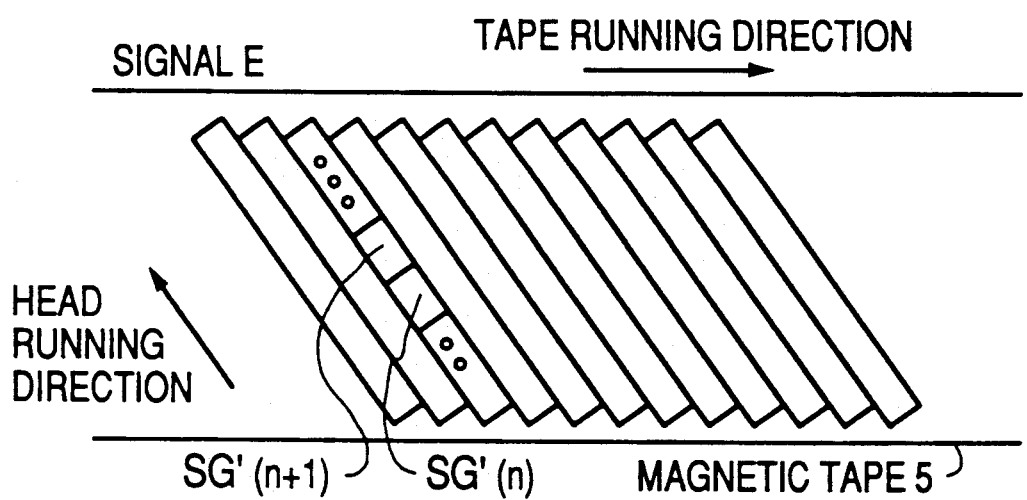

FIG. 1 is a block diagram of a digital video signal recording/reproducing apparatus according to a first embodiment of this invention. This embodiment shows a rotary head type digital VTR in which the image plane is divided into blocks, and a digital video signal is subjected to high-efficiency encoding and recorded on a magnetic tape. FIGS. 2(a)-(c) show arrangements of signal components for explaining the operation of the apparatus shown in FIG. 1.

When a digital video signal A is to be recorded, it is sent to a shuffling circuit 10. In the shuffling circuit 10, a blocking circuit 101 blocks the pixels data in such a manner that one luminance signal and two chrominance signals are respectively blocked in rectangular blocks on the image plane, and inputted to a shuffling memory 102. FIG. 2 (a) is a diagram showing the method of dividing the image plane into blocks for the signal A. Luminance signal (called Y) and two chrominance signals (called C1 and C2) are each divided into blocks. Generally, from the visual effects of luminance signal and chrominance signal, the number of pixels of the chrominance signal may be smaller than that of the luminance signal for forming one image plane (for example, REC601 Standard), so that such an example is shown in FIG. 2(a) that the number of vertical pixels of C1 and that of C2 are the same as that of Y and the number of horizontal pixels of C1 and that of C2 are a half that of Y (called as 4:2:2 in standard TV signal). Also, Y, C1 and C2 are equal in the number of horizontal pixels and that of vertical pixels contained in each block as well as are equal in block size in an orthogonal transformation circuit 201 (an inverse-orthogonal transformation circuit 211 when the signal is to be reproduced). As a result, for example, in FIG. 2 (a), four blocks expressed as Y(1), Y(2), C1(1) and C2(1) are respectively the smallest units of the luminance signal and two chrominance signals existing at the same position on the image plane. A unit of the four blocks is called a macro-block (MB). Now, if i is a positive integer, four blocks Y(2i−1), Y(2i), C1(i) and C2(i) are respectively the luminance signal and two chrominance signals existing at the same position on the image plane, whose macro-block is expressed as MB(i). The shuffling memory 102 rearranges the blocks so that the four blocks Y(2i−1), Y(2i), C1(i) and C2(i), containing the luminance signal and two chrominance signals existing at the same position on the image plane, or the blocks in each macro-block MB(i) are always continuous. The shuffling circuit 10 outputs a signal B thus shuffled. FIG. 2(b) shows an arrangement of blocks in the signal B. In this case, i, j, k and m which are shown in the parenthesis of Y, C1, C2 and MB are different positive integers from each other, meaning they are discontinuous on the image plane.

The blocks of the luminance signal and chrominance signals shuffled as above (signal B) are sent to an encoding circuit 20. In the encoding circuit 20, the signal B is subjected to an orthogonal transformation by Hadamard transformation or cosine transformation through an orthogonal transformation circuit 201, and then, to a variable length encoding in accordance with the data amount of each block through a variable length encoding circuit 202. In the variable length encoding process, the quantizing step width is adjusted in accordance with the data amount of the block, thus executing the high-efficiency encoding by reducing the data amount as a whole. The orthogonal transformation is a method used for this purpose. The code length of information in each block is variable, but by adjusting the quantizing step width, it is controlled to be within a specific data amount by collecting a plurality of micro-blocks. FIG. 2 (b) shows a signal arrangement of a signal C, which is an output from the encoding circuit 20. In this embodiment, the number of macro-blocks to be contained within the specific data amount is made to be two. Also, MG'(i) shown in FIG. 2 (b) indicates that the macro-block MG(i) shown above has been subjected to orthogonal transformation and variable length encoding.

A segmenting circuit 30 forms a segment composed of the plural macro-block units within said specific data amount. This segment is added with control information necessary for the segment including the quantizing step width and the address of each macro-block. In addition, each segment is formed so as to always contain a constant amount of data. FIG. 2 (b) shows a signal arrangement of a signal D, which is an output from the segmenting circuit 30. In FIG. 2 (b), SG(n) shows the n-th segment and contains MB'(i) and MB'(j) of the signal C subjected to variable length coding as above.

The segmented data D is added with an error correction code by an error correction encoding circuit 401 of a recording circuit 40 and recorded digitally via a recording head 402 onto a magnetic tape 5. FIG. 2 (c) shows a signal arrangement of a recording signal (signal E) to be recorded onto the magnetic tape 5. Also, in FIG. 2 (c), SG'(n) indicated that the error correction code was applied to SG(n) of the segmented signal D.

By operating as shown above, in this embodiment, the luminance signals Y(2i−1) and Y(2i) and the chrominance signals C1(i) and C2(i) existing at the same position on the image plane are contained in a same segment SG'(n) on the magnetic tape 5.

When the recorded signal is to be reproduced, first, a reproducing head 412 of a detection circuit 41 detects a digital signal (corresponding to the signal E shown in FIG. 2 (c)) from the magnetic tape 5. The digital signal thus detected is sent to an error correction decoding circuit 411 to correct errors generated in the tape/head system and extracts a reproduced variable length coded signal (corresponding to the signal D shown in FIG. 2 (b)).

In this case, however, errors may be generated in the tape/head system that cannot be corrected even by the error correction decoding circuit 411 (for example, the burst error resulting from a defect on the tape). In such case, since the recording signal is data subjected to variable length encoding, the image quality may be largely degraded due to the propagation of errors that cannot be corrected. As a result, the number of blocks contained in a segment may be the number of blocks constituting the whole image plane. However, the constitution of each segment by a smaller number of block units may be more effective in that the propagation of errors generated in the tape/head system or the like may be contained within a segment and the variable length codes can be normally decoded even if the segments are taken out skippingly as in case of high-speed reproduction. In this embodiment, the number of blocks contained in one segment is eight, or two in the number of macro-blocks.

In this embodiment, however, the segment is formed to contain a smaller number of blocks, but the four blocks Y(2i−1), Y(2i), C1(i) and C2(i) continuously existing at the same position on the image plane are rearranged to be always contained in a same segment (SG'(n) or SG(n)) in the shuffling circuit 10, so that even if the segments are not formed continuously, the luminance signal and chrominance signals existing at the same position on the image plane can be simultaneously detected.

Next, the segmented signal (corresponding to the signal D shown in FIG. 2 (b)) obtained by the detection circuit 41 is made a reproduced variable length coded signal (corresponding to the signal C shown in FIG. 2 (b)) by an inverse-segmenting circuit 31. The reproduced variable length coded signal is decoded by a variable length code decoding circuit 212 of a decoding circuit 21. The decoded signal is returned by an inverse-orthogonal transformation circuit 211 to a digital video signal (corresponding to the signal B shown in FIG. 2 (b)). At this time, the signal is shuffled by blocks. So, in an inverse-shuffling circuit 11, first, an inverse-shuffling memory 112 controls the input/output address of the memory to rearrange the data inversely to that on the recording side, and a de-blocking circuit 111 outputs a reproduced digital signal (corresponding to the signal A shown in FIG. 2 (a)) in the same order of the original video signal.

As explained above, according to this embodiment, even if the segments are taken out skippingly from the recording pattern in the high-speed reproduction of a digital VTR to form the image plane, the luminance signal and chrominance signals being at the same position on the image plane are contained in each segment being taken out, so that different luminance and chrominance signals are not mixed at the same position even on the high-speed reproducing image plane.

Also, this embodiment exemplifies such a case that the number of horizontal pixels of the chrominance signal on one image plane is a half that of the luminance signal, but the invention is not limited thereto. For example, a digital video signal having a number of horizontal pixels of the chrominance signal on one image plane which is a quarter that of the luminance signal which (can be called 4:1:1) may be made possible. In this case, four horizontally continuous blocks of the luminance signal Y existing at the same position on the image plane for one block of each of the chrominance signals C1 and C2, or six blocks in total may be always contained in a same segment. In addition, even if the number of horizontal pixels of the chrominance signal on one image plane is a half that of the luminance signal and the number of vertical pixel of the former is a half that of the latter (can be called as 4:2:0), four blocks consisting of two horizontally continuous blocks and two vertically continuous blocks of the luminance signal Y existing at the same position on the image plane for one block of each of the chrominance signals C1 and C2, or six blocks in total may be always contained in a same segment.

Figure 3:
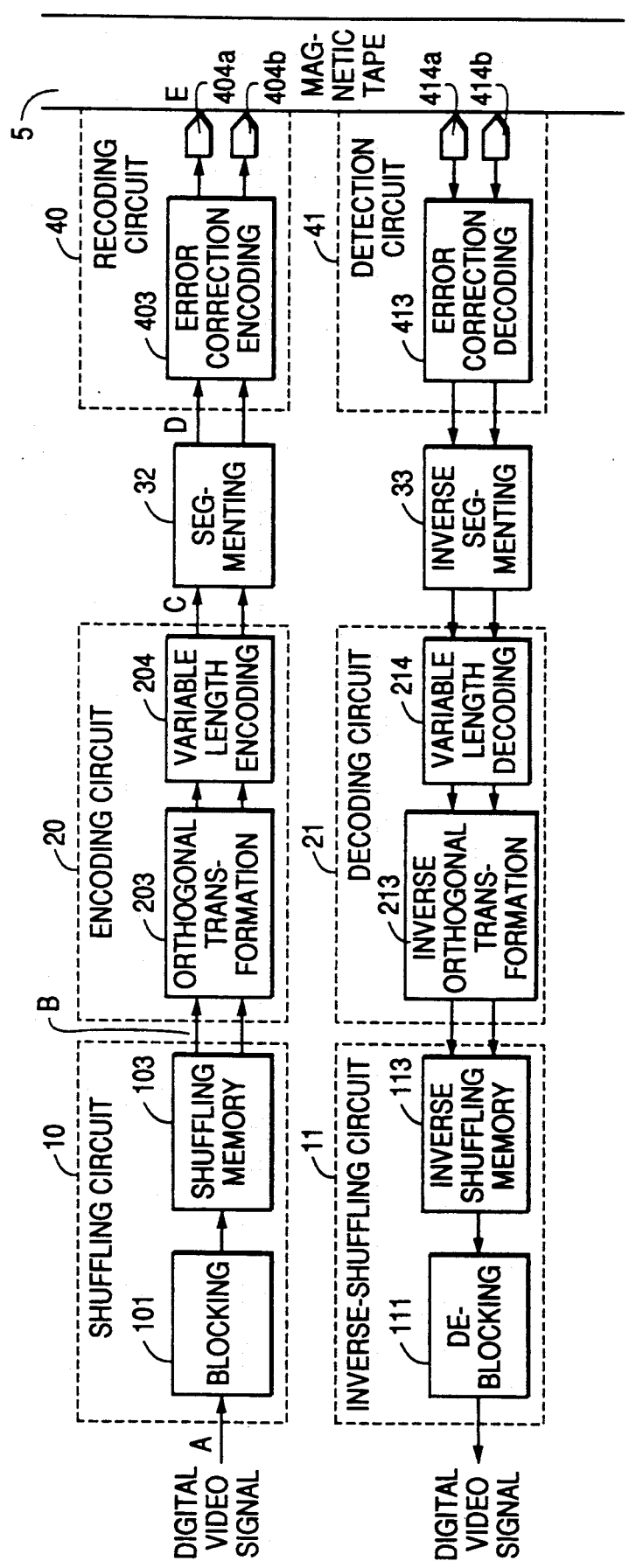
FIG. 3 is a block diagram of a digital video signal recording/reproducing apparatus according to a second embodiment of this invention.

Next, a digital video signal recording/reproducing apparatus according to a second embodiment of this invention will be described below. FIG. 3 is a block diagram of a digital video signal recording reproducing apparatus of this embodiment. This embodiment shows a rotary head type VTR in which a video signal is divided into blocks, then subjected to high-efficiency encoding and recorded on a magnetic tape simultaneously with two channels.

The embodiment of FIG. 3 differs from the first embodiment in that the circuit system from a shuffling circuit 10 to an inverse-shuffling circuit 11 is 2-channeled. That is, the recording head and reproducing head are each provided in a 2-channel manner (recording heads 404a and 404b, reproducing heads 414a and 414b), thereby recording or reproducing simultaneously in parallel with the two channels. With the digital video signal recording/reproducing apparatus arranged as above, the operation will be explained below while referring to FIG. 2 (a) and FIGS. 4(a)-(b) showing the arrangements of signal components.

In this embodiment, a digital video signal is blocked by a blocking circuit 101 of a shuffling circuit 10, and then, rearranged by a shuffling memory 103 so that the luminance and chrominance signals existing at the same position on the image plane are divided to two channels. For example, in case of the signal shown in FIG. 2 (a), the rearrangement is made in such a manner that with respect to the four blocks Y(2i−1), Y(2i), C1(i) and C2(i) existing at the same position on the image plane, the blocks Y(2i−i) and C1(i) (macro-block MB1(i)) are continued for one of the two channels and the blocks Y(2i) and C2(i) (macro-block MB2(i)) are continued for the other of the two channels as shown in signal B of FIG. 4 (a).

Figure 4A:
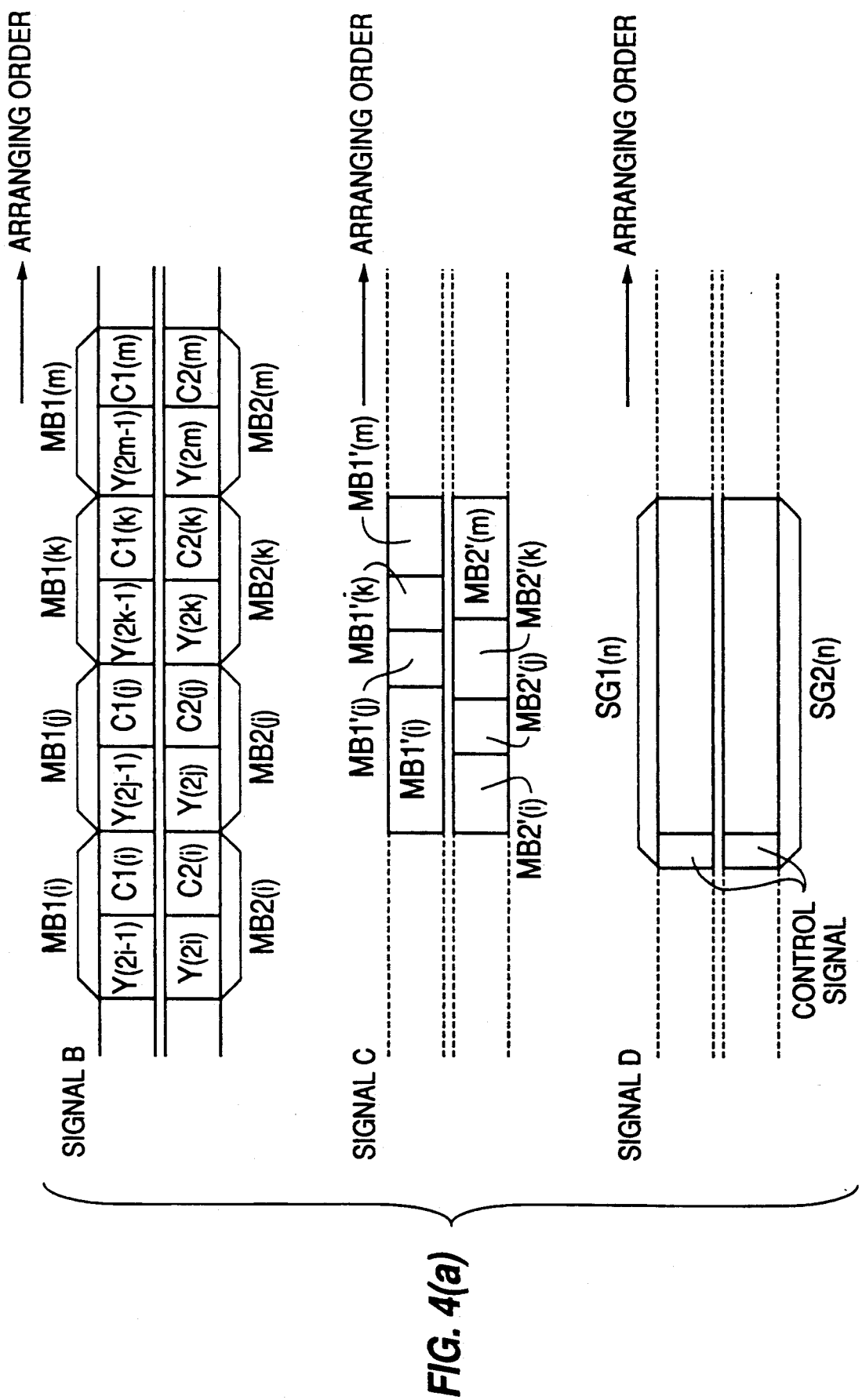
FIGS. 4(a)-(b) show arrangements of signal components for explaining the operation of the apparatus shown in FIG. 3.
Figure 4B:
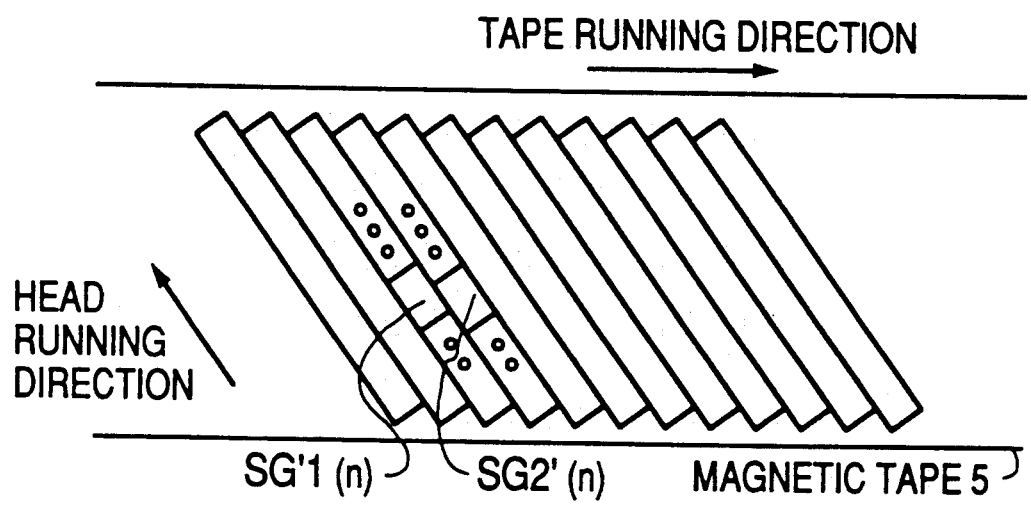

Next, in an encoding circuit 20, the blocked signal B thus rearranged for the two channels is successively subjected to orthogonal transformation and variable length encoding by an orthogonal transformation circuit 203 and a variable length encoding circuit 204 to output a variable length coded signal C as shown in FIG. 4 (a). Then, a segmenting circuit 32 collects the data of plural blocks on a channel by channel basis correspondingly to one of the two channels to form a segment having a fixed length and outputs a segmented signal D for the two channels as shown in FIG. 4(a). In signal D of FIG. 4 (a), one segment contains the data for four macro-blocks. However, one macro-block contains one block of the luminance signal and one block of the chrominance signal. As a result, the number of blocks in one segment is eight, similar to that of the first embodiment.

In a recording circuit 40, the two-channel signals D outputted from the segmenting circuit 32 are subjected to error correction encoding by an error correction encoding circuit 403 to obtain two-channel recording data (expressed as a signal E shown in FIG. 4 (b)) which are simultaneously recorded onto the magnetic tape 5 through the recording heads 404a and 404b. In this case, when the segments are recorded for two channels simultaneously in parallel by using two recording heads 404a and 404b, the four blocks existing at the same position on the image plane resulted from arranging by the shuffling memory 103 are divided into two channels, and contained into two segments recorded always simultaneously in parallel. That is, two segments such as SG1'(i) containing MB1(i) made of Y(2i−1) and C1(i) and SG2'(i) containing MB2(i) made of Y(2i) and C2(i) are recorded simultaneously in parallel on the magnetic tape 5 through the recording heads 404a and 404b of the two channels.

When the recorded signal is to be reproduced, two reproducing heads 414a and 414b of a detection circuit 41 respectively detect simultaneously in parallel the signals recorded simultaneously in parallel through the recording heads 404a and 404b (signal E shown in FIG. 4 (b) and send them to an error correction decoding circuit 411. The error correction decoding circuit 411 corrects errors generated in the tape/head system for the segments detected simultaneously in parallel to extract reproduced segmented signals (corresponding to the signal D shown in FIG. 4 (a)). An inverse-segmenting circuit 33 extracts reproduced variable length coded signals (corresponding to the signal C shown in FIG. 4 (a)) from the reproduced segmented signals. In a decoding circuit 21, a variable length decoding circuit 214 executes the variable length decoding of the reproduced variable length coded signals thus extracted simultaneously in parallel, and an inverse-orthogonal transformation circuit 213 executes the inverse-orthogonal transformation of the variable length decoded signals to return to the digital video signals (corresponding to the signal B shown in FIG. 4 (a)). The digital video signals thus obtained by the decoding circuit 21 are shuffled by blocks in the two channels in parallel. So, in an inverse-shuffling circuit 11, an inverse-shuffling memory 113 rearranges the blocks of the two parallel channels so as to arrange them inversely to that when recorded, and a de-blocking circuit 111 returns the blocked signals thus rearranged to the arrangement of pixels of the original digital video signal to obtain a reproduced digital video signal (corresponding to the signal A shown in FIG. 2 (a)).

In this embodiment, as explained above, the two-channel data are recorded/reproduced always simultaneously in parallel, so that the luminance and chrominance signals existing at the same position on the image plane can be always taken out together. As a result, similar to the first embodiment, even on the high-speed reproducing image plane, different luminance and chrominance signals are not mixed at the same position on the image plane. Further in this embodiment, even if the number of blocks contained in respective segments is the same, the number of blocks existing at the same position on the image plane (two blocks of Y(2i−1) and C1(i)) will become a half that in the first embodiment (four blocks of Y(2i−1), Y(i), C1(i) and C2(i)). This means that in high-efficiency encoding through the orthogonal transformation circuit 203 and variable length encoding circuit 204, if the plural blocks contained in one fixed length segment exist apart from each other on the image plane, it will be difficult for deviation of the data of each fixed length segment to take place when performing variable length encoding in block unit. As a result, the compression efficiency will be effectively improved. In the first embodiment, the number of blocks existing at the same position on the image plane within one segment is four, two luminance blocks and two chrominance blocks. In the second embodiment, however, it may be made half resulting from the 2-channeling. Accordingly, (because of an extremely fine area existing on the image plane), if the data amount for the four blocks is very large, by dividing the four blocks into two as in the second embodiment, the effects on the blocks being at the other position on the image plane contained in one segment can be reduced.

Also, in this embodiment, a circuit construction of making possible simultaneous recording/reproducing of a digital video signal in two channels is exemplified, but a larger number of channels makes it even more difficult to generate a deviation of the data amount of each fixed length segment, so that the compressing efficiency can be effectively improved.

In addition, in this embodiment, the two-channel data transmission is constructed from the output of the shuffling memory 103 to the input of the error correction encoding circuit 403 when the signal is to be recorded and from the output of the error correction decoding circuit 413 to the input of the inverse-shuffling memory 113 when the recorded signal is to be reproduced as shown in FIG. 3. Referring to such data transmitting construction, if circuit construction between the components is time-shared to multiplex the parallel data of two channels to one system, the data transmission between the components becomes possible with one system. In this case, channel division may be performed immediately before the recording head and the channel integration may be performed immediately after the reproducing head.

Also, in this embodiment, the orthogonal transformation is adopted as compressing means, but any other means can be used if it can encode the image plane on a block by block basis. In addition, the rotary head type digital VTR is adopted as a recording device, but a disk type device may also be used.

What is claimed is:

1. A digital video signal recording apparatus comprising:

shuffling means, receiving an input digital video signal containing digital luminance signals and digital chrominance signals, for forming blocks of luminance signals each composed of digital luminance signals of a plurality of pixels and blocks of chrominance signals each composed of digital chrominance signals of a plurality of pixels, forming a plurality of macro-blocks each composed of predetermined blocks of luminance signals and predetermined blocks of chrominance signals, and rearranging an order of the plurality of macro-blocks;

encoding means for encoding each of the blocks of luminance signals and the blocks of chrominance signals to obtain coded blocks such that a data quantity of coded blocks obtained by coding blocks of luminance signals and blocks of chrominance signals in a predetermined number of macro-blocks is within a predetermined data quantity;

segmenting means for forming from the coded blocks segments each having a constant data quantity and containing the coded blocks obtained by coding the blocks of luminance signals and blocks of chrominance signals in said predetermined number of macro-blocks and a control data for identifying each segment; and recording means for recording said segments on a recording medium;

wherein said shuffling means forms the plurality of macro-blocks such that coded blocks obtained by coding blocks of luminance signals and blocks of chrominance signals composed of digital luminance and chrominance signals of pixels existing at a same position on an image plane are contained in a same segment.

2. A digital video signal recording apparatus comprising:

shuffling means, receiving an input digital video signal containing digital luminance signals and digital chrominance signals, for forming blocks of luminance signals each composed of digital luminance signals of a plurality of pixels and blocks of chrominance signals each composed of digital chrominance signals of a plurality of pixels, forming from said blocks of luminance and chrominance signals a plurality of macro-blocks each composed of blocks of luminance signals and blocks of chrominance signals composed of digital luminance and chrominance signals of pixels existing at a same position on an image plane, and rearranging an order of the plurality of macro-blocks;

encoding means for encoding each of the blocks of luminance signals and the blocks of chrominance signals to obtain coded blocks such that a data quantity of coded blocks obtained by coding blocks of luminance signals and blocks of chrominance signals in a predetermined number of macro-blocks is within a predetermined data quantity;

segmenting means for forming from the coded blocks segments each having a constant data quantity and containing the coded blocks obtained by coding the blocks of luminance chrominance signals in said predetermined number of macro-blocks and a control data for identifying the each segment; and recording means for recording said segments on a recording medium;

wherein coded blocks obtained by coding the blocks of luminance signals and blocks of chrominance signals composed of digital luminance and chrominance signals of pixels existing at a same position on the image plane are contained in a same segment and recorded in a same recording area on the recording medium.

3. A digital video signal recording and reproducing apparatus comprising:

shuffling means, receiving an input digital video signal containing digital luminance signals and digital chrominance signals, for forming blocks of luminance signals each composed of digital luminance signals of a plurality of pixels and blocks of chrominance signals each composed of digital chrominance signals of a plurality of pixels, forming from said blocks of luminance and chrominance signals a plurality of macro-blocks each composed of blocks of luminance signals and blocks of chrominance signals composed of digital luminance and chrominance signals of pixels existing at a same position on an image plane, and rearranging an order of the plurality of macro-blocks;

encoding means for encoding each of the blocks of luminance signals and the blocks of chrominance signals to obtain coded blocks such that a data quantity of coded blocks obtained by coding blocks of luminance signals and blocks of chrominance signals in a predetermined number of macro-blocks is within a predetermined data quantity;

segmenting means for forming from the coded blocks segments each having a constant data quantity and containing the coded blocks obtained by coding the blocks of luminance and chrominance signals in said predetermined number of macro-blocks and a control data for identifying each segment;

recording means for recording said segments on the recording medium;

detection means for detecting said segments recorded on the recording medium;

inverse-segmenting means for extracting the coded blocks from the segments detected by said detection means;

decoding mean for decoding the extracted coded blocks to obtain reproduced blocks of luminance signals and reproduced blocks of chrominance signals; and inverse-shuffling means for rearranging the order of the reproduced blocks of luminance signals and the reproduced blocks of chrominance signals inversely to the rearrangement in said shuffling means to be in an original order and de-blocking the reproduced blocks of luminance and chrominance signals in the original order to obtain reproduced digital luminance and chrominance signals of the digital video signal.

4. A digital video signal recording apparatus comprising:

shuffling means, receiving an input digital video signal containing digital luminance signals and digital chrominance signals, for forming blocks of luminance signals each composed of digital luminance signals of a plurality of pixels and blocks of chrominance signals each composed of digital chrominance signals of a plurality of pixels, forming a plurality of channels of macro-blocks each composed of predetermined blocks of luminance signals and predetermined blocks of chrominance signals, and rearranging an order of the macro-blocks in each of the plurality of channels;

encoding means for encoding each of the blocks of luminance signals and the blocks of chrominance signals to obtain a plurality of channels of coded blocks such that a data quantity of coded blocks obtained by coding blocks of luminance signals and blocks of chrominance signals in a predetermined number of macro-blocks in each of the plurality of channels is within a predetermined data quantity;

segmenting means for forming from the plurality of channels of coded blocks a plurality of channels of segments each having a constant data quantity and containing the coded blocks obtained by coding the blocks of luminance and chrominance signals in said predetermined number of macro-blocks and a control data for identifying each segment; and recording means for recording the plurality of channels of segments in parallel on the recording medium;

wherein said shuffling means forms the plurality of channels of macro-blocks such that coded blocks obtained by coding blocks of luminance signals and blocks of chrominance signals composed of digital luminance and chrominance signals of pixels existing at a same position on an image plane are contained in segments which are recorded by said recording means simultaneously in parallel on the recording medium.

5. A digital video signal recording and reproducing apparatus comprising:

shuffling means, receiving an input digital video signal containing digital luminance signals and digital chrominance signals, for forming blocks of luminance signals each composed of digital luminance signals of a plurality of pixels and blocks of chrominance signals each composed of digital chrominance signals of a plurality of pixels, forming a plurality of channels of macro-blocks each composed of predetermined blocks of luminance signals and predetermined blocks of chrominance signals, and rearranging an order of the macro-blocks in each of the plurality of channels;

encoding means for encoding each of the blocks of luminance signals and the blocks of chrominance signals to obtain a plurality of channels of coded blocks such that a data quantity of coded blocks obtained by coding blocks of luminance signals and blocks of chrominance signals in a predetermined number of macro-blocks in each of the plurality of channels is within a predetermined data quantity;

segment means for forming from the plurality of channels of coded blocks a plurality of channels of segments each having a constant data quantity and containing the coded blocks obtained by coding the blocks of luminance and chrominance signals in said predetermined number of macro-blocks and a control data for identifying each segment;

recording means for recording the plurality of channels of segments in parallel on the recording medium;

said shuffling means forming the plurality of channels of macro-blocks such that coded blocks obtained by coding blocks of luminance signals and blocks of chrominance signals composed of digital luminance and chrominance signals of pixels existing at a same position on an image plane are contained in segments which are recorded by aid recording means simultaneously in parallel on the recording medium;

detection means for detecting the plurality of channels of segments recorded on the recording medium in parallel such that the segments recorded simultaneously in parallel are detected simultaneously in parallel;

inverse-segmenting means for extracting the coded blocks from said segments detected in each of the plurality of channels;

decoding means for decoding the extracted coded blocks in each of the plurality of channels to obtain reproduced blocks of luminance signals and reproduced blocks of chrominance signals; and inverse-shuffling means for rearranging the order of the reproduced blocks of luminance signals and the reproduced blocks of chrominance signals inversely to the rearrangement in said shuffling means to be in an original order, and de-blocking the reproduced blocks of luminance and chrominance signals in the original order to obtain reproduced digital luminance and chrominance signals of the digital video signal.

* * * * *